United States Patent
Khalil et al.

(10) Patent No.: US 9,467,565 B2
(45) Date of Patent: Oct. 11, 2016

(54) SUPERVISORY COMMUNICATION SYSTEM

(71) Applicant: Verizon Patent and Licensing Inc., Arlington, VA (US)

(72) Inventors: Manah M. Khalil, Coppell, TX (US); Vijaya R. Challa, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 48 days.

(21) Appl. No.: 14/293,219

(22) Filed: Jun. 2, 2014

(65) Prior Publication Data
US 2015/0350434 A1 Dec. 3, 2015

(51) Int. Cl.
*H04M 3/00* (2006.01)
*H04M 3/51* (2006.01)

(52) U.S. Cl.
CPC ......... *H04M 3/5175* (2013.01); *H04M 3/5166* (2013.01); *H04M 2203/401* (2013.01)

(58) Field of Classification Search
CPC .. H04M 3/5175; H04M 3/51; H04M 3/5191; H04M 3/5183; H04M 3/5166; H04M 3/5232
USPC .......... 379/265.03, 265.06, 265.09
See application file for complete search history.

(56) References Cited

U.S. PATENT DOCUMENTS

| | | | | |
|---|---|---|---|---|
| 2013/0019183 A1* | 1/2013 | Reeves | ................. | G06F 9/4443 715/745 |
| 2013/0142322 A1* | 6/2013 | Grasso | ............. | G06Q 10/06398 379/265.08 |
| 2014/0140497 A1* | 5/2014 | Ripa | ................... | H04M 3/5133 379/265.06 |

* cited by examiner

*Primary Examiner* — Rasha Al Aubaidi

(57) ABSTRACT

A method may include identifying diverse applications associated with supervision of agent work stations. The method may include generating a unified view interface based on supervisory communications associated with the diverse applications and receiving a request for the unified view interface from a supervisory interface device. The method may include exporting the unified view interface to the supervisory interface device. The method may further include receiving notifications associated with the diverse applications, and sending the notifications to the supervisory interface device.

20 Claims, 8 Drawing Sheets

SUPERVISORY COMMUNICATION SYSTEM

BACKGROUND

Companies often use call centers to address customer inquiries, take customer orders and/or resolve customer problems. Interactive voice response (IVR) systems are frequently used to initially interact with the caller to obtain information regarding the call. The call is then often transferred to a device associated with a human agent to service the customer inquiry and provide the desired assistance. Multiple agents may be supervised by a particular supervisor. The supervisor may assign tasks and monitor the agents for compliance with tasks and goals in the call center.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a unified view interface that includes supervisory communications from a plurality of different applications. The supervisory communications may be based on multiple different supervised agents. The system may include a supervisory interface and associated interaction mechanism that facilitates the real time information availability, trending, monitoring and actions. The system may present the different applications in the same unified view interface in a manner that allows the supervisor to intuitively supervise agents based on priority of events and actions.

The methods and systems may allow supervisors (also referred to herein as "coaches") to access a mobile coach application to perform varied/diverse tasks. Systems and/or methods may manage diverse tasks on a daily basis and enable real time handling of the tasks/events. The unified view interface may provide tools that augment the skill set of the coach including a seamless delivery mechanism for notifications as well as an interaction mechanism. The systems may allow the user to access communications in the unified view interface or alternatively, in the native applications associated with each supervisory communication.

Figure 1:
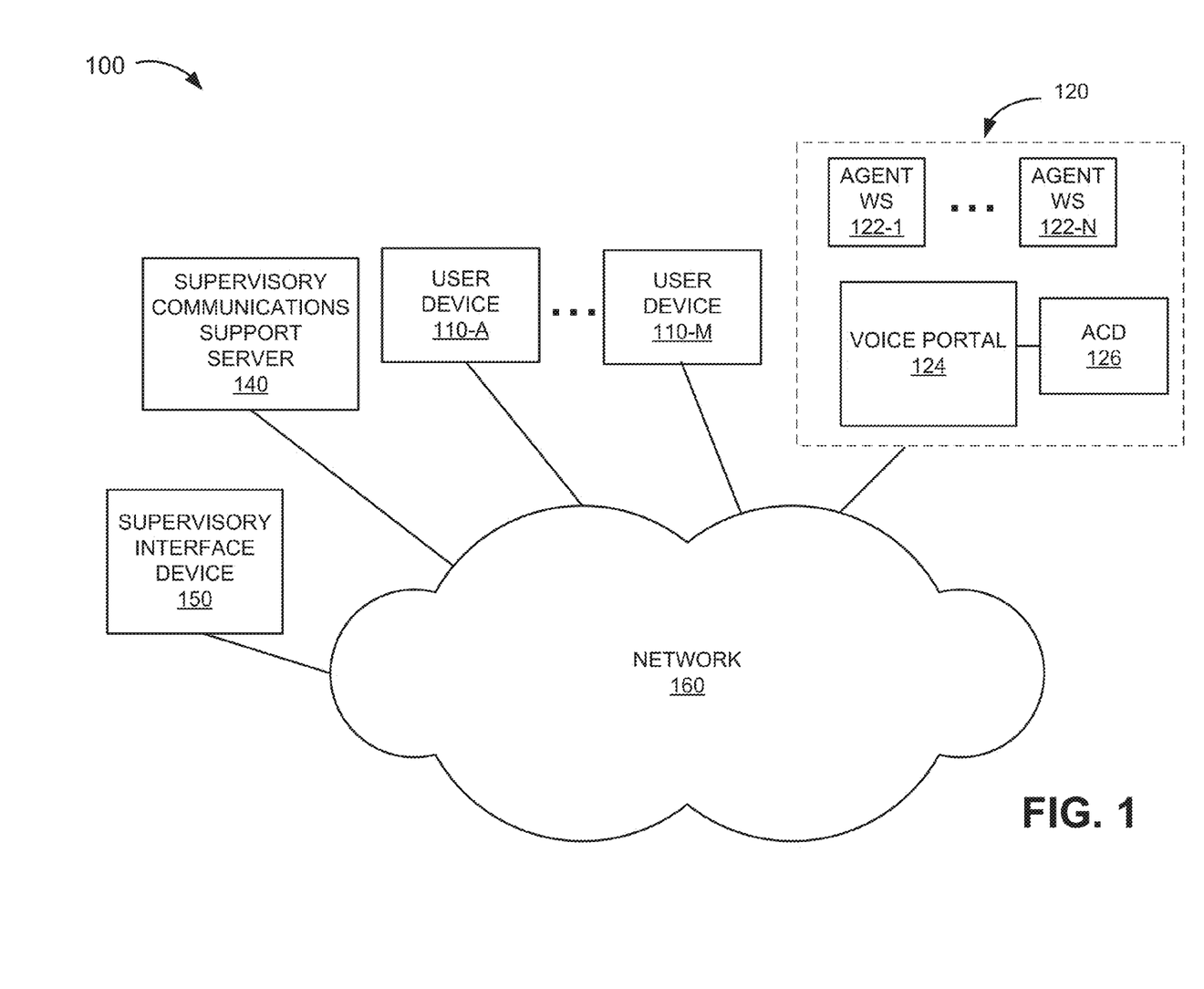
FIG. 1 is a diagram of an exemplary network in which systems and/or methods described herein may be implemented.

FIG. 1 is a block diagram of an exemplary network 100 in which systems and methods described herein may be implemented. Referring to FIG. 1, network 100 includes user devices 110A through 110-M (referred to collectively as user devices 110 and individually as user device 110), call center 120, supervisory communications support server 140, supervisory interface device 150, and network 160. The particular arrangement and number of components of network 100 shown in FIG. 1 are illustrated for simplicity. In practice there may be more user devices 110, call centers 120, supervisory communications support servers 140, supervisory interface devices 150, and/or networks 160. Additionally, network 100 may contain fewer components, different components, differently arranged components, or additional components than depicted in FIG. 1. For example, although not shown, network 100 may include network devices, session initiation protocol (SIP) proxy devices, and other devices that facilitate call center operations and supervisory management functions consistent with embodiments described herein. Components of network 100 may be connected via wired and/or wireless links.

User device 110 may a device that a customer of the call center may use to contact the call center. User device 110 may include any type of communication or computation device that is capable of transmitting and receiving voice signals and/or data to/from a network, such as network 160. For example, user device 110 may include any standard telephone, cordless telephone, cellular telephone, or other type of conventional telephone that interfaces with a public switched telephone network (PSTN) and/or wireless network to place and receive telephone calls. User device 110 may also include any client, such as a computer device, a web-based appliance, etc., that is configured to provide telephone functions using, for example, voice over Internet protocol (VoIP), H.323 protocol, etc. For example, user device 110 may include a SIP-based telephone device. User device 110 may further include any type of communication or computation device, such as a PC, laptop computer, tablet computer, personal digital assistant, cell phone, etc., that is capable of transmitting data (e.g., emails, text messages, instant messages, facsimiles, etc.), video data (e.g., video calls, video chats, video messages, etc.) and/or voice data (e.g., voice calls) to/from a network, such as network 160.

Call center 120 may represent a call center configured to receive and handle a large volume of calls. As shown in FIG. 1, in some embodiments, call center 120 may include and agent workstations (WSs) 122-1 through 122-N (referred to collectively as agent WSs 122 or individually as agent WS 122), voice portal 124, and automatic call distributor (ACD) 126.

Agent WSs 122 may include a workstation or computer, such as a personal computer or laptop. Agent WSs 122 may represent a workstation/computer and operator (or agent) used to handle calls from callers that require human intervention. Agent WSs 122 may include a software client (e.g., a SIP client) that may run, for example, on a conventional PC, laptop computer or other computing device. Agent WSs 122 may also include any device capable of performing IP based messaging, such as VoIP, to transmit voice, video and/or text. Agent WSs 122 may also include any telephone device (not shown) to place and receive telephone calls. For example, the telephone device may be a standard telephone, a cordless telephone, a cellular telephone or any other type of telephone. The telephone device may also include any type of device that is capable of transmitting and receiving voice signals to/from a data network. For example, the telephone device may include any client, such as a computer device, a web-based appliance, etc., that is configured to provide telephone functions. In some implementations, agent WSs 122 may include speech recognition hardware/ software that receives voice responses from a caller and identifies what the caller has voiced. In an exemplary implementation, agent WSs 122 may be associated with voice portal 124 and ACD 126. In addition, in an exemplary implementation, agent WSs 122 may be connected to ACD 126 and/or voice portal 124 via a network, such as network 160. In alternative implementations, agent WSs 122 may be connected directly to ACD 126 and/or voice portal 124, connected via a LAN, connected via a private network, etc.

Voice portal 124 may represent a front-end device associated with call center 140. In an exemplary implementation, voice portal 124 may include interactive voice response (IVR) unit that interacts with callers to obtain information associated with the call.

ACD 126 may distribute calls received at voice portal 124 to one of agent WSs 122-1 through 122-N. ACD 126 is illustrated as being a separate component that is located externally from voice portal 124. In some implementations, ACD 126 may be part of voice portal 124 (e.g., a subcomponent of voice portal 124). In each case, ACD 126 may forward calls to an available one of the agent WSs 122.

Supervisory communications support server 140 may include a server that provides support for a unified view interface that includes supervisory communications and that may be accessed via supervisory interface device 150, such as described below with respect to FIG. 4. Supervisory communications may include communications that enable the supervisor to supervise agent WSs 122. These communications may include direct communication with the supervised agent WS 122 as well as monitoring communications that allow the supervisor to determine a status of the agent with respect to particular elements or components of assigned tasks (e.g., particular types of calls, stages of a transaction or event, a call campaign, categories of callers, etc.). Supervisory communications support server 140 may support an interface design and interaction mechanism that facilitates real time information availability, trending, monitoring and actions on supervisory interface device 150. Supervisory communications support server 140 may receive communications associated with a call center 120 and route particular communications based on supervisory requirements (e.g., monitoring of particular agents, types of calls, etc.).

Supervisory interface device 150 may include a device that provides a unified viewing interface in which supervisory communications for multiple agents within multiple diverse applications may be displayed, such as described with respect to FIG. 5 herein below. Examples of such diverse applications may include a group of applications in which each application is different from the other (e.g., a texting (SMS) application, a telephone application, a calendar application or two different types of texting applications, etc.). Supervisory interface device 150 may determine a unified view interface based on supervisory communications associated with the diverse applications. The unified view interface includes common graphical elements and display rules associated with the diverse applications. Supervisory interface device 150 may allow supervisors/coaches to perform varied/diverse tasks on a daily basis while maintaining context, priority and a comparative (or relative) time of occurrence of each supervisory communication with respect to each supervised (or managed agent) and the supervisor's overall workload. The context may identify a person, an event, an action, a time or other factors associated with supervisory communications in a manner that allows the supervisor to place the supervisory communication within a larger whole (or context).

In implementations described herein, systems and methods may provide a unified viewing interface that includes supervisory communications between a supervisory person and a plurality of supervised individuals. The supervisory communications may be received or sent via diverse multiple applications that may be concurrently displayed in the unified viewing interface. The systems may include a publications/subscription (pub/sub) system in which the supervisor may subscribe to alerts for particular supervised agent WSs 122 based on preselected criteria.

Figure 2:
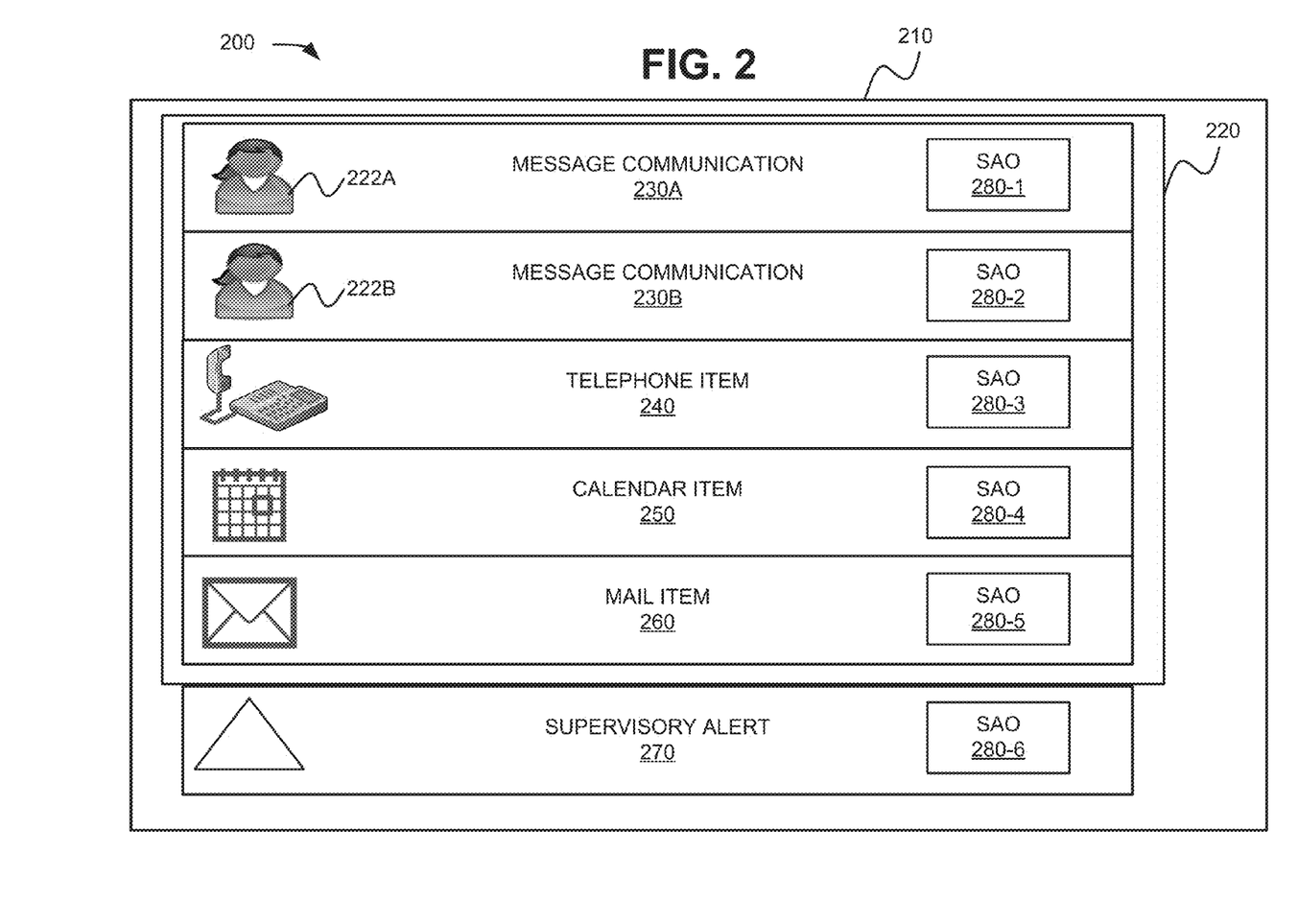
FIG. 2 illustrates an exemplary supervisory communications interface.

FIG. 2 illustrates an exemplary supervisory communications interface 200. As shown in FIG. 2, supervisory communications interface 200 may include a unified supervisory display 210 in which supervisory notifications (and communications) 220, supervisory alerts 270 and supervisory action options ("SAOs") 280 (shown in FIG. 2 as SAO 280-1 to SAO 280-6, associated with each of the items displayed in unified supervisory display 210) may be displayed. Supervisory notifications 220 may include a message communications 230 with supervised personnel 222 (e.g., shown as conversation 230A with supervised worker 222A and conversation 230B with supervised worker 222B), telephone items 240, calendar items 250 and mail items 260. Supervised personnel 222 may correspond to particular agent WSs 122 and associated other devices. Although, a particular arrangement of supervisory notifications 220, supervisory alerts 270 and supervisory action options 280 in unified supervisory display 210 is shown in FIG. 2, it should be understood that this configuration is an illustration of a configuration of unified supervisory display interface 210 at a particular instance in time. The components may be arranged in any manner consistent with principles described herein and fewer, different or additional components may be included in supervisory communications interface 200.

Unified supervisory display 210 may provide a unified display that allows supervisors to access diverse applications in a same context and to communicate with and perform various tasks associated with different agent WSs 122. For example, unified supervisory display 210 may display notifications 220 associated with agent WS 122 in a predetermined sequence based on a relative priority, urgency or a latest received (or sent) communication for the agent WSs 122. In one embodiment, the notifications 220 may be arranged based on the subject matter of a call or event currently associated with the particular agent WS 122. In another embodiment, notifications 220 and supervisory alerts 270 may be grouped based on a particular supervised agent WS 122 (for example all message communications 230, telephone items 240, and mail items 250 associated with the particular agent WS 122 may be presented based on an input provided by the supervisor or alternatively as part of a standard configuration).

Unified supervisory display 210 may allow the supervisor to pay attention to particular items (e.g., a customer phone call associated with an agent WS 122) while maintaining supervision of other items (agents WSs 122). Unified supervisory display 210 may be arranged in a manner to ensure that the attention of supervisor is not limited to a particular application (e.g., based on visual placement of the diverse applications within unified supervisory display 210). Unified supervisory display 210 may include multiple applications simultaneously displayed. Unified supervisory display 210 may arrange the applications in a relative position (to other applications) based on information content and time stamp associated with supervisory communications received within the application (e.g., an application that includes the most recently updated supervisory communication may be placed at the top of the unified view). Unified supervisory display 210 may provide uniform delivery and seamless interaction based on the diverse applications. Unified supervisory display 210 may receive notifications in a uniform format from supervisory communications support server 140. Alternatively, unified supervisory display 210 may convert diverse notification formats to a uniform format that may be displayed in the unified view.

Supervisory notifications 220 may include notifications and communications between the supervisor and supervised workers. Supervisory notifications 220 may include communications between the supervisor and supervised workers (e.g., text communication/conversations), posted notices from the supervisor to agents WSs 122, etc. Supervisory notifications 220 may include information that requires an action performed by supervisor that may or may not be accessible via the supervisory communications interface 200 (e.g., a visual inspection of a particular item). Supervisory notifications 220 may be grouped by common elements, agent WSs 122, particular issues, etc.

Message communications with supervised personnel 230 may be arranged based on a latest received message (e.g., conversation 230A with supervised worker 232A may include a later communication than conversation 230B with supervised worker 232B). Message communications 230 may include text messages, short message service (SMS), and other applications that support real time messaging. Telephone items 240 may include items with which the supervisor may access telephonic capabilities such as telephone communications, voicemail, etc. Calendar items 250 may include scheduled items associated with supervision of agent WSs 122. For example, calendar items 250 may include a periodic review of agent WS 122. Additionally, calendar items 250 may include items that are determined by the supervisor or items provided by other supervisors or personnel associated with the call center 120.

Supervisory alerts 270 may include alerts regarding supervised workers (agents WSs 122) that may be received in a pub/sub system such as described below with respect to FIG. 7. The pub/sub system may be a system in which the supervisor subscribes to particular alerts that are published by supervisory communications support server 140. In instances in which a predetermined condition is detected, the supervisory communications support server 140 may send the supervisory alerts to subscribing supervisors (e.g., supervisory interface devices 150). Supervisory alerts 270 may include predetermined alerts that the supervisor may subscribe to as well as customized alerts that the supervisor may design to monitor particular events, situations and/or agent WSs 122.

Supervisory action options 280 may provide an ability to perform particular actions associated with supervision of agents WSs 122 based on the capabilities of the applications associated with the notification 220, or supervisory alert 270. Supervisory action options 280 may be configured based on category, agent WSs 122, supervisor defined requirement (e.g., calls that continue beyond a predetermined time limit without a particular response), etc. Each of message communications 230, telephone items 240, calendar items 250, mail items 260, and supervisory alerts 270 may have associated supervisory action options 280 based on the particular application (e.g., call back based on voicemail, flag email, etc.). For example, for telephone items 240 the supervisor may listen to calls, record calls, receive an alert based on particular chronic callers or callers that have previously initiated a transaction, etc. Further supervisory action options 280 may include highlighting particular items for later disposition, responding to an item via a particular application or interface, scheduling an alert, forwarding messages, etc.

Supervisory communications interface 200 may allow the supervisor to access and manage a diversity of the tasks associated with multiple diverse applications in a real time requirement environment in a seamless manner. Supervisory communications interface 200 may be extensible to accommodate additional applications that include supervisory communications functions, and intuitive and friendly for quick navigation/interaction in order to execute the supervisory functions.

Figure 3:
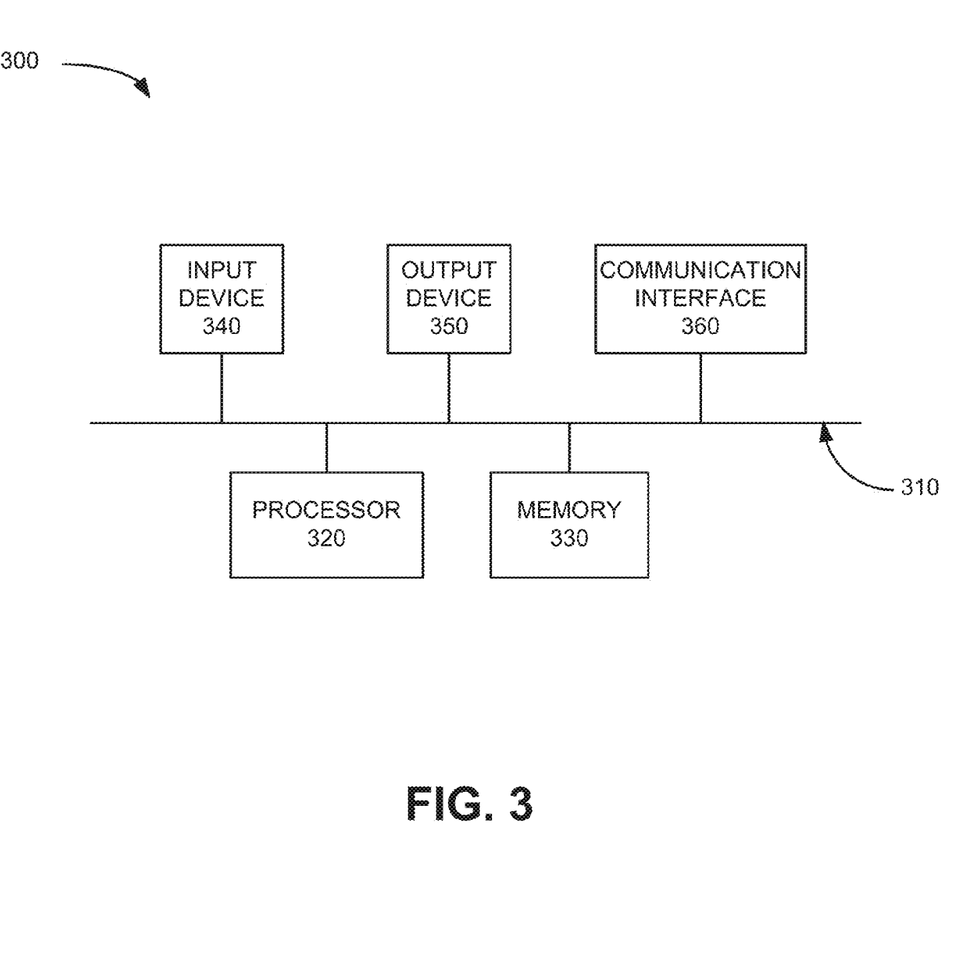
FIG. 3 is a diagram of exemplary components of one or more devices of the network depicted in FIG. 1.

FIG. 3 is a diagram of exemplary components of a device 300 that may correspond to one or more devices of environment 100, such as user devices 110, call center 120, agent WSs 122, voice portal 124, ACD 126, supervisory communications support server 140, supervisory interface device 150, or (components of) network 160. As illustrated, device 300 may include a bus 310, a processor 320, a main memory 330, a read-only memory (ROM) 340, a storage device 350, an input device 360, an output device 370, and a communication interface 380.

Bus 310 may include a path that permits communication among the components of device 300. Processor 320 may include one or more processors, microprocessors, or other types of processing units that may interpret and execute instructions. Main memory 330 may include a random access memory (RAM) or another type of dynamic storage device that may store information and instructions for execution by processor 320. ROM 340 may include a ROM device or another type of static storage device that may store static information and/or instructions for use by processor 320. Storage device 350 may include a magnetic and/or optical recording medium and its corresponding drive.

Input device 360 may include a mechanism that permits an operator to input information to device 300, such as a remote control, control buttons, a keyboard, a mouse, a pen, a microphone, voice recognition and/or biometric mechanisms, a touch screen, etc. Output device 370 may include a mechanism that outputs information to the operator, including a display, an indicator light, a speaker, etc. Communication interface 380 may include any transceiver that enables device 300 to communicate with other devices and/or systems. For example, communication interface 380 may include mechanisms for communicating with another device or system via a network.

As described herein, device 300 may perform certain operations in response to processor 320 executing machine-readable ("software") instructions contained in a computer-readable medium, such as main memory 330. A computer-readable medium may be defined as a non-transitory memory device. A memory device may include space within a single physical memory device or spread across multiple physical memory devices. The machine-readable instructions may be read into main memory 330 from another computer-readable medium, such as storage device 350, or from another device via communication interface 380. The machine-readable instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and machine-readable instructions.

Although FIG. 3 shows exemplary components of device 300, in other implementations, device 300 may contain fewer components, different components, differently arranged components, or additional components than depicted in FIG. 3. In still other implementations, one or more components of device 300 may perform one or more other tasks described as being performed by one or more other components of device 300.

Figure 4:
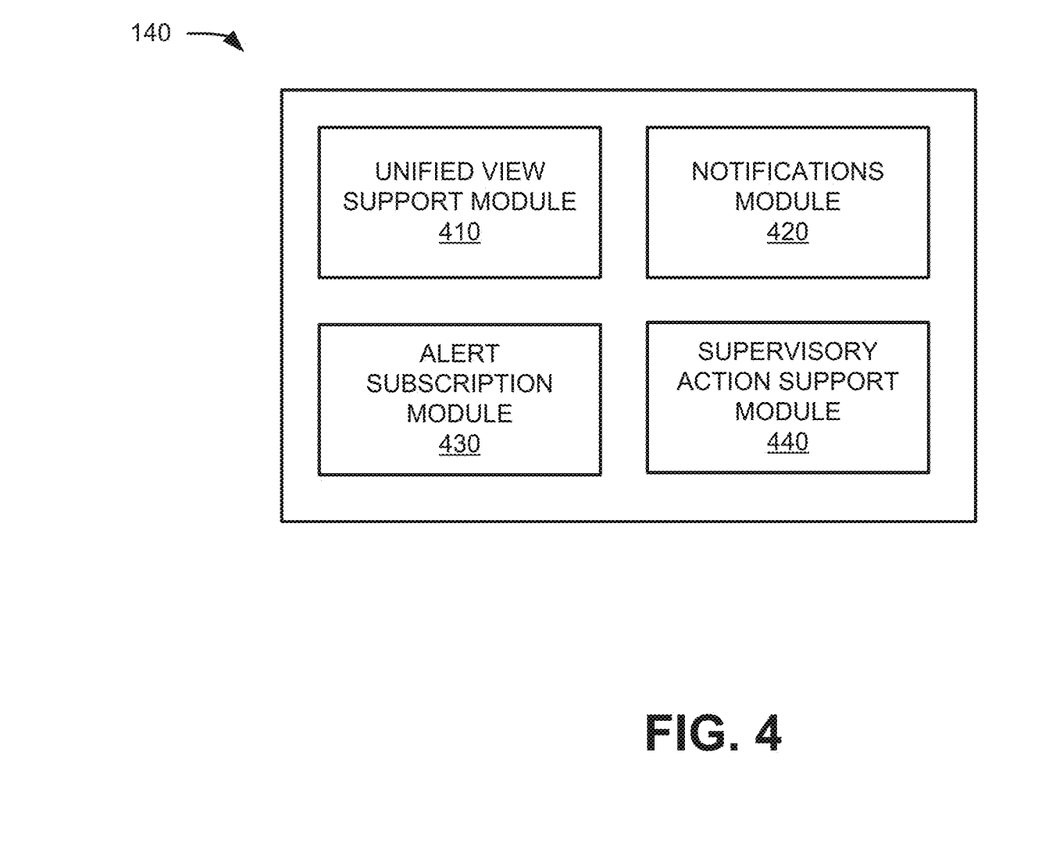
FIG. 4 is a functional block diagram of the supervisory communications support server of FIG. 1.

FIG. 4 is a functional block diagram of supervisory communications support server 140. In one implementation, the functions described in connection with FIG. 4 may be performed by one or more components of device 300 (FIG. 3). As shown in FIG. 4, supervisory communications support server 140 may include unified view support module 410, notifications module 420, alert subscription module 430 and supervisory action support module 440.

Unified view support module 410 may collect information from diverse applications (i.e., a group of applications in which each application is different from the other) associated with supervisory interface device 150, such as described below with respect to FIG. 6. Unified view support module 410 may build a unified view and export (or "push") the unified view to a client application (configured to process unified view) on supervisory interface device 150.

Notifications module 420 may provide consistent notification information and communication with supervised agent WSs 122 and other personnel (e.g., other supervisors, management personnel associated with the call center, etc.). Notifications module 420 may receive information that is formatted in a particular format on agent WSs 122 (e.g., using different tools and native applications) and transcode the information into a format that may be presented on the unified view on supervisory interface device 150. Notifications module 420 may launch a specific event in an appropriate application (e.g., a text message) based on a predetermined category. Notifications module 420 may provide notification information in a format that is consistent with the unified view while providing the distinction between various categories (including applications, events, agent WSs 12, etc.) at the same time.

According to one embodiment, notifications module 420 may support event trending capabilities that identify events that are occurring within the supervisor's area of responsibility. The diverse applications may include a trending application that identifies trends with regard to predefined parameters in network 100 for supervised agent WSs 122 (e.g., call conversions, productivity targets, etc.). Notifications module 420 may identify events trend based on activity, lifetime and priority to facilitate better focus point for the supervisor. For example, notifications module 420 may identify an increased call volume associated with a particular issue, particular anomalous results (e.g., slow processing times, low percentage of call conversions, etc.) for agent WSs 122 associated with different types of calls, etc.

Alert subscription module 430 may allow the supervisor to sign up for different alerts in a publication subscription (pub/sub) system to manage workstations 122. Alert subscription module 430 may provide a capability to subscribe to events based on particular personnel and particular actions, such as described below with respect to FIG. 7.

Supervisory action support module 440 may provide options based on particular categories associated with each supervisory communication. Supervisory action support module 440 may provide options based on the application associated with the supervisory communications. For example, in the event of a particular category of customer call, supervisory action support module 440 may allow the supervisor to listen to or join the customer call. Supervisory action support module 440 may allow the supervisor to hang up, transcribe, record, or transfer the call. For voicemail, supervisory action support module 440 may provide options associated with voicemail applications. Additionally, supervisory action support module 440 may allow possible actions based on a category of the incoming customer caller, the agent WSs 122, and supervisor set flags for particular events, etc. Supervisory action support module 440 may provide a capability to respond to events via user gestures based on category and/or configuration of the supervisory communication.

Figure 5:
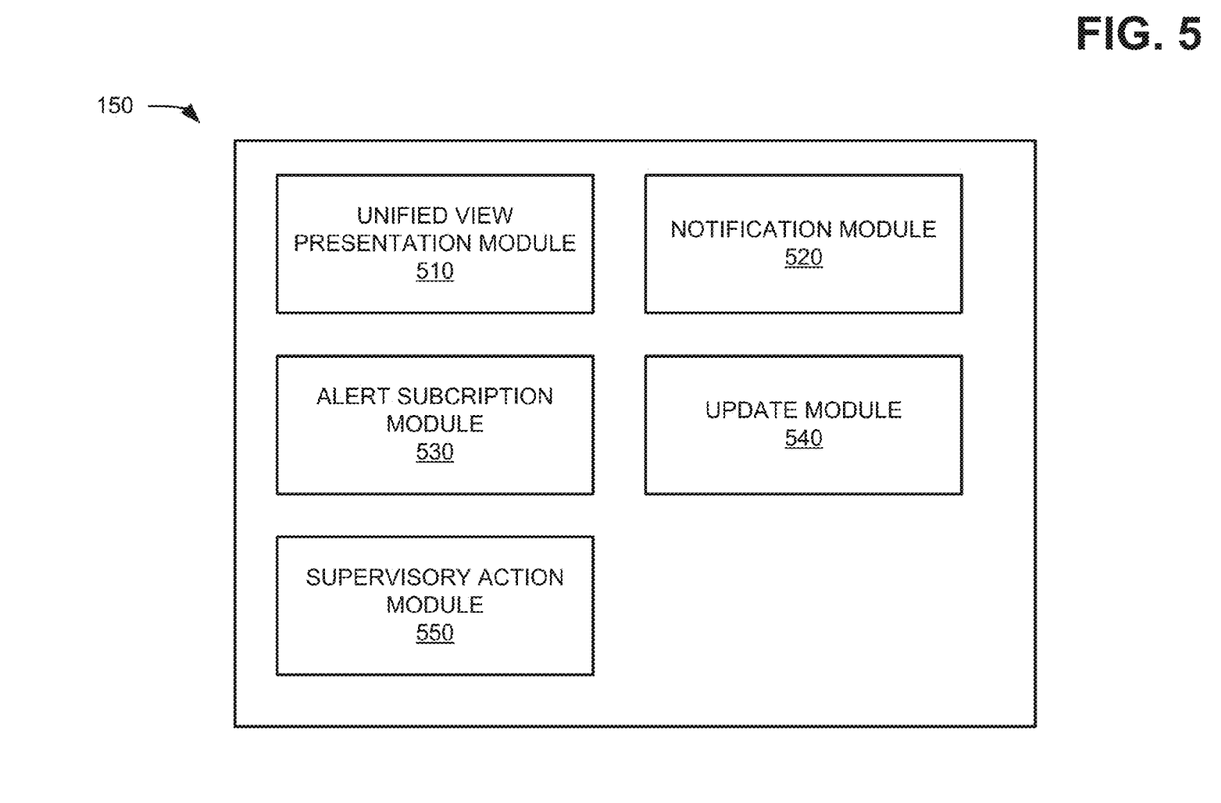
FIG. 5 is a functional block diagram of the supervisory interface device of FIG. 1.

FIG. 5 is a functional block diagram of supervisory interface device 150. In one implementation, the functions described in connection with FIG. 5 may be performed by one or more components of device 300 (FIG. 3). As shown in FIG. 5, supervisory interface device 150 may include unified view presentation module 510, notification module 520, alert subscription module 530, update module 530 and supervisory action module 550.

Unified view presentation module 510 may determine a unified view that includes diverse applications associated with multiple different agent WSs 122. Unified view presentation module 510 may provide a single screen for managing representatives or agents in a call center. Unified view presentation module 510 may allow simultaneous display of information from multiple sources for a single agent WS 122 or multiple different agent WSs 122 in a unified view. The unified view does not require context switching. Unified view presentation module 510 may function as a "catch-all" event gatherer that aggregates all supervisory communications in a single unified view. For example, unified view presentation module 510 may present the diverse applications in a chat window format in which all events are hosted in one single window. Unified view presentation module 510 may allow the supervisor to interact with each item to identify additional information regarding an event (e.g., the supervisor may slide the event in the unified view right and/or left to see additional information relative to the event). Unified view presentation module 510 may present the unified view in a manner that allows the supervisor to track people (and agent WSs 122) under supervision. Unified view presentation module 510 may receive information from multiple sources, such as system generated alerts, alerts from call management system ACD, calls from voice portal notification regarding flags from the customer profile, etc.

Notification module 520 may provide notifications from agent WSs 122 and other parties within call center via different applications that may be presented within the unified view. Notification module 520 may display notifications within particular applications or associated with particular agent WSs 122 based on limits and parameters associated with each application and/or agent WS 122. For example, notification module 520 may show the last one or two messages from a text message conversation. Notification module 520 may provide time stamps, and may be expandable to provide additional information. Notification module 520 may include reminders from the supervisor's calendar, emails, calls, as well as information from the customer profile associated with each supervisory communication.

Alert subscription module 530 may allow the supervisor to subscribe to events regarding the supervision of agent WSs 122 that may be published by supervisory communications support server 140. Alert subscription module 530 may allow the supervisor to configure events that are to be published by supervisory communications support server 140. Alert subscription module 530 may receive subscribed alerts in instances in which subscribed events are identified by supervisory communications support server 140.

According to one embodiment, alert subscription module 530 may allow classification of calls (e.g., campaign calls) and the capability to determine particular alerts based on the classification of the call. In an instance in which a representative is insufficiently capable of handling a particular type of call, the supervisor may set an alert to be notified in whenever the representative receives that particular type of call.

Update module 530 may determine and apply rules regarding placement and movement of items as the items are updated in unified view. Update module 530 may move an application to a top position (or a central position based on the focus point of the supervisor) in instances in which there are updates. In other instances, update module 530 may move items based on priority, supervisor interaction, recent activity, etc. In one example, update module 530 may allow the supervisor/user to automatically push emails that are replies to emails that the supervisor has sent out to a top position.

Supervisory action module 550 may provide a capability to apply supervisory actions to items. Supervisory action module 550 may provide interface graphical elements, such as buttons, dial pads, etc., which may allow the supervisor to execute particular actions based on the notifications or alerts. Supervisory action module 550 may provide an action menu to participate in call (e.g., swipe right). For example, supervisory action module 550 may allow the supervisor to listen to calls, to join calls, to mute participants of calls, place participants on hold, etc. Supervisory action module 550 may provide a capability to expand chats, read, archive, mark unread, join live chats, etc. Supervisory action module 550 may provide capability to execute appropriate actions associated with emails.

Figure 6:
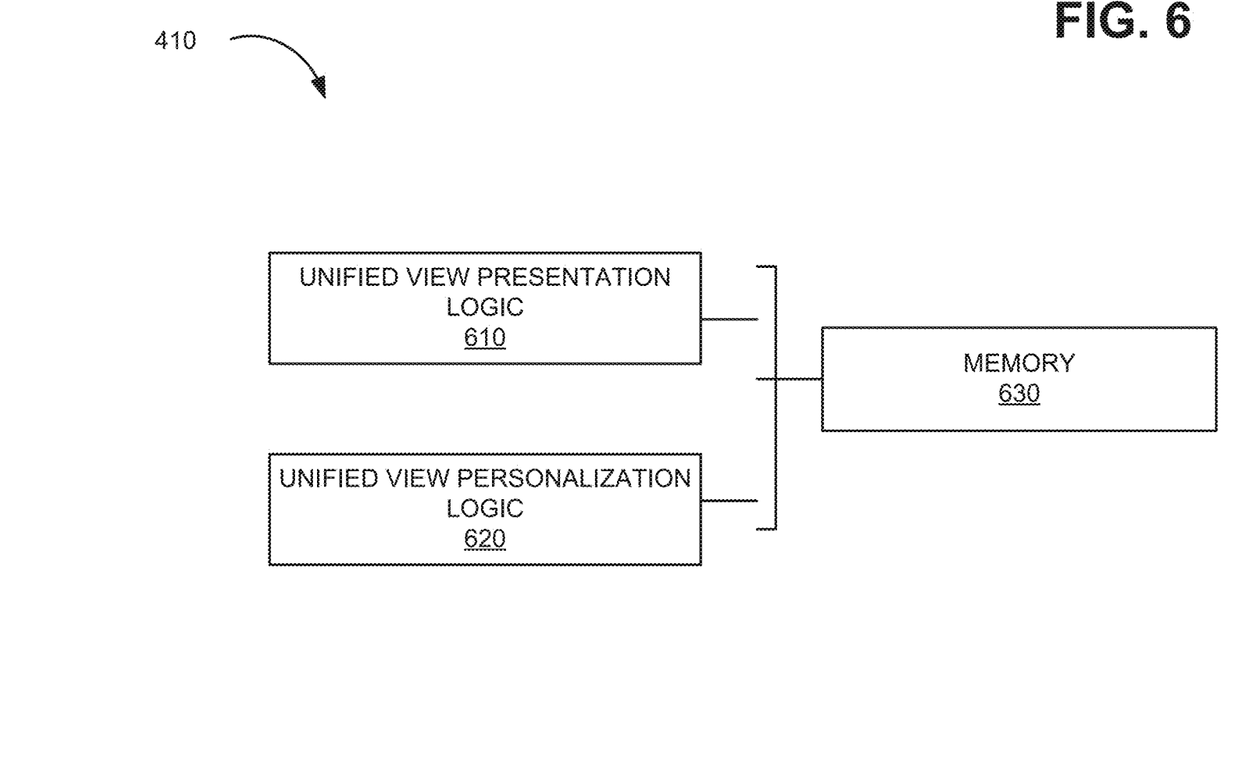
FIG. 6 depicts a functional block diagram of the unified view support module of FIG. 4.

FIG. 6 is an exemplary functional block diagram of unified view support module 410 according to an exemplary implementation. As shown in FIG. 6, unified view support module 410 may include unified view presentation logic 610, processing assignment logic 620, and memory 630.

Unified view presentation logic 610 may provide rendering support and guidelines for displaying common elements and particular graphical components associated with the diverse applications within the unified view. Unified view presentation logic 610 may retrieve the guidelines from memory 630. Unified view presentation logic 610 may further define the unified view based on screen layout requirements, time stamps associated with the supervisory communications, etc. Unified view presentation logic 610 may present the diverse applications in a single unified interface, sorted and displayed within the unified view. Unified view presentation logic 610 may sort the applications in a dynamic manner based on agent WSs 122, supervisory requirements, priority, urgency, activity, lifetime, latest received communication, etc.

Unified view presentation logic 610 may provide rules (retrieved, for example, from memory 630) that determine how the unified view is affected by updates. Unified view presentation logic 610 may determine that any supervisory communication that updates gets on the top. Alternatively, unified view presentation logic 610 may determine the updated unified view based on a combination of recent activity, priority, most recently updated communication, etc. Unified view presentation logic 610 may determine rules and guidelines by which all supervisory tools and members (i.e., agent WSs 122 and other personnel) are displayed on the screen within the unified view. Unified view presentation logic 610 may allow the supervisor to add sounds, vibrations, etc., to notifications.

According to an embodiment, unified view presentation logic 610 may enable the supervisor to break out one or more of the diverse applications displayed in the unified view into a complete native application that is separate from the unified view. This may provide access to additional functionality that is not available within the unified view as well as provide the supervisor the option to work within an environment of their choice (e.g., a portable document file format). In some instances the native application may provide additional ease of use, options, etc. Unified view presentation logic 610 may determine rules and configuration that allow the supervisor to open each of the diverse applications that may be displayed in unified view within a native application (separate from the unified view).

Unified view personalization logic 610 may determine rules and guidelines regarding how the supervisor may personalize the unified view displayed on supervisory interface device 150. Unified view personalization logic 610 may allow each user to determine a personalized view (e.g., according to persons that the supervisor is managing). Unified view personalization logic 610 may determine the rules for personalization of the unified view in association with a pub/sub system for alerts within network 100. Unified view personalization logic 610 may allow the supervisor to prioritize notifications.

Memory 630, as described above, may store information regarding guidelines for presenting the unified view and personalization of the unified view. Memory 630 may also information regarding caller, agent WSs 122 and supervisors.

Figure 7:
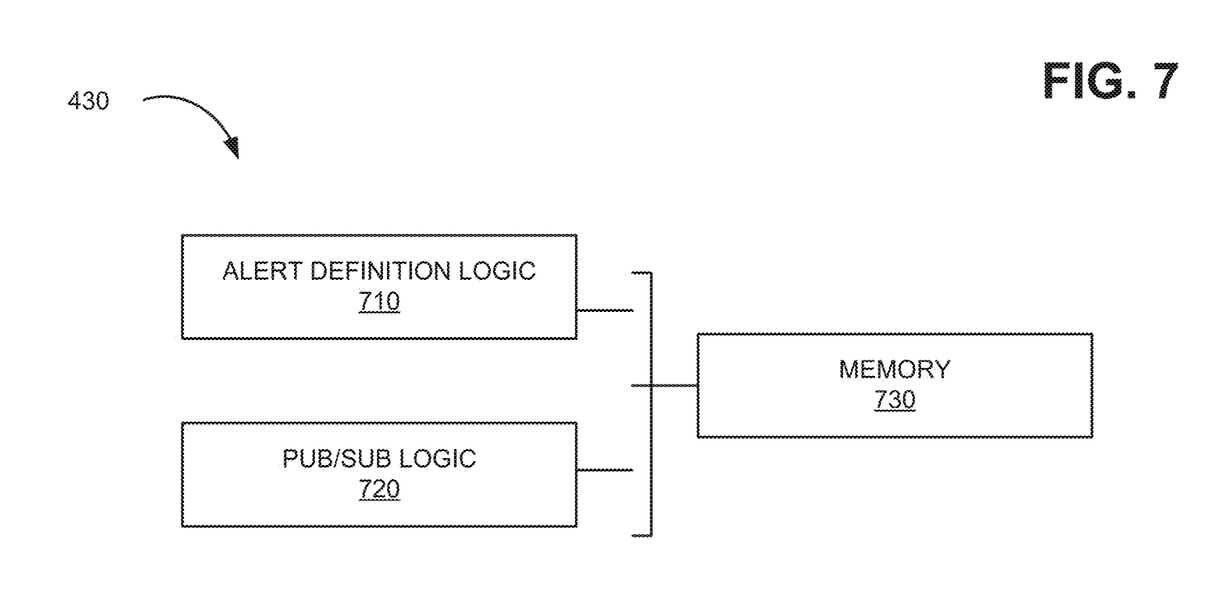
FIG. 7 depicts a functional block diagram of the publication/subscription module of FIG. 4.

FIG. 7 is an exemplary functional block diagram of alert subscription module 430 according to an exemplary implementation. As shown in FIG. 5, alert subscription module 430 may include alert definition logic 710, pub/sub logic 720, and memory 730.

Alert definition logic 710 may define rules regarding alerts that may be distributed in network 100. Alert definition logic 710 may determine alerts that may be set by supervisors (via supervisory interface device 150) and the modes of notification based on detection of a condition associated with the alert. Alert definition logic 710 may receive and store instructions regarding personalization of alerts, for example in memory 730. The instructions may be required to fit within predetermined parameters (e.g., a number of alerts, authorization level, frequency, etc.). Alert definition logic 710 may allow the supervisor to define alerts on an agent WS 122 plus action specific basis (i.e., alerts may arise when a particular agent WS 122 does a particular action). For example, alert definition logic 710 may allow the supervisor to receive an alert for disconnection of service calls (as opposed to sales calls, etc.).

Alert definition logic 710 may allow each supervisor to select different categories to monitor via alerts, such as incoming chats, incoming calls, etc. Alert definition logic 710 may further allow the supervisor to define a threshold for a particular customer or agent WSs 122 (e.g., the notification may be triggered in instances in which the agent WS 122 does not close a predetermined number of calls).

Alert definition logic 710 may access an application programming interface (API) that to communicate with the supervisory interface device 150 and define actions that trigger particular responses (e.g., swipe left to right, click and hold, etc.). Alert definition logic 710 may define the interface between supervisory interface device 150 and alert subscription module 430.

Pub/sub logic 720 may define a pub/sub system by which the alerts are disseminated in network 100. Pub/sub logic 720 may allow the supervisor to subscribe to an event which pub/sub logic (or other components of network 100) may publish as a source system. For example, ACD 126 may publish an event to the system via pub/sub logic 729. Pub/sub logic 720 may publish incoming calls, transferred calls, dropped calls, calls to a specific number, etc., and each supervisor may determine the calls that the particular supervisor chooses to monitor. The supervisors may subscribe to the pub/sub logic 720 and receive notifications (or alerts) in real time.

Memory 730, as described above, may store information regarding personalization of alerts. Memory 730 may also store information that defines alerts, the pub/sub system, etc.

Figure 8:
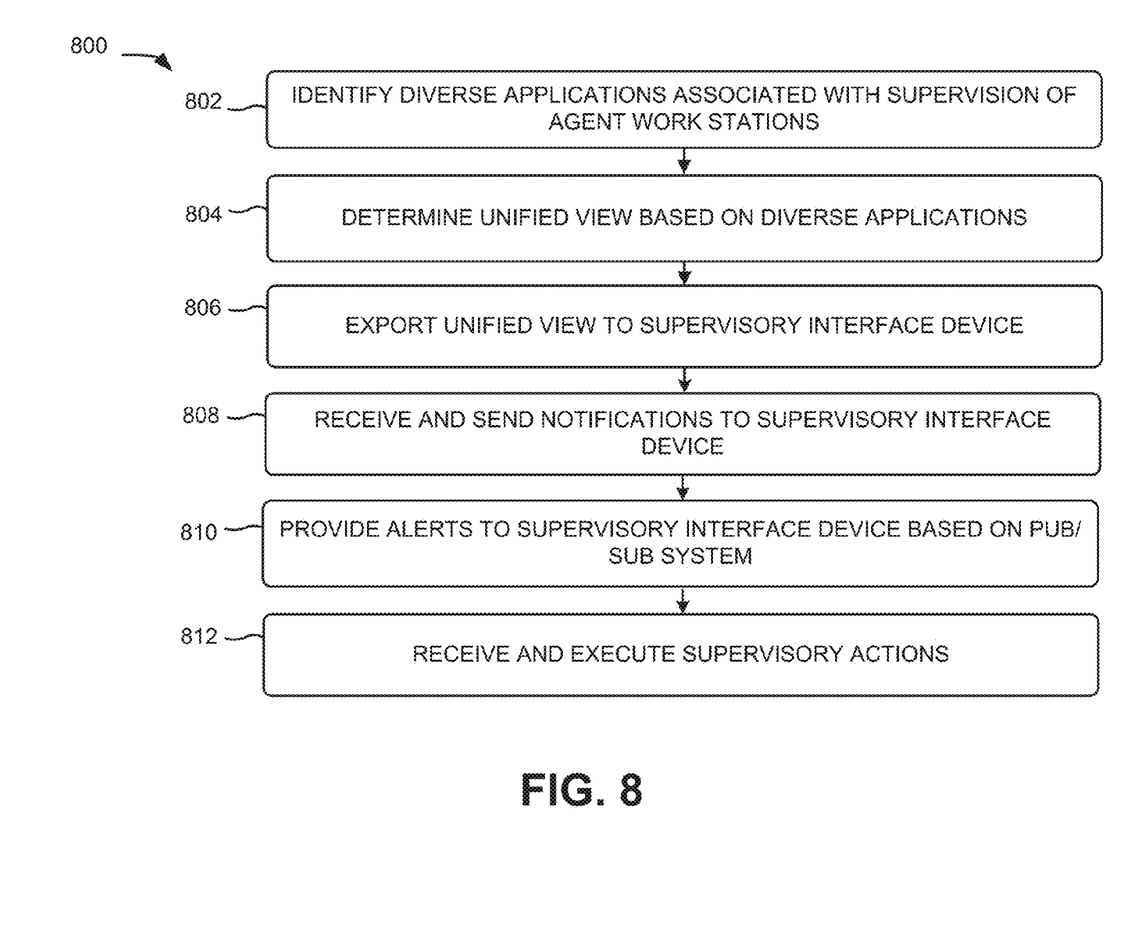
FIG. 8 is a flow chart of an exemplary process for providing a unified view interface including supervisory communications according to implementations described herein.

FIG. 8 is a flow chart of an exemplary process 800 for providing a unified view of supervisory communications according to implementations described herein. In one implementation, process 800 may be performed by supervisory communications support server 140. In another implementation, some or all of process 800 may be performed by another device or group of devices, including or excluding supervisory communications support server 140.

As shown in FIG. 8, process 800 may include supervisory communications support server 140 identifying diverse applications associated with supervision of agent WSs 122 (block 802). For example, supervisory communications support server 140 may determine (or identify) that the suite of applications that the supervisor may access to supervise agent WSs 122 via supervisory interface device 150 includes particular computer programs, applications, etc.

Process 800 may include supervisory communications support server 140 determining or generating a unified view of the diverse applications that may be accessed via supervisory interface device 150 (block 804). In some embodiments, supervisory communications support server 140 may generate the unified view based on common graphical elements, a template associated with the unified view and particular graphical elements associated with each of the diverse applications.

Supervisory communications support server 140 may export the unified view to supervisory interface device 150 (block 806). Supervisory communications support server 140 may receive a request for the unified view from a supervisory interface device 150. Supervisory communications support server 140 may export the unified view to supervisory interface device 150 in response to a request from supervisory interface device 150. Supervisory communications support server 140 may provide support for the unified view on supervisory interface device 150 (including visual elements and underlying functionality associated with each of the diverse applications).

Supervisory communications support server 140 may receive and send notifications to supervisory interface device 150 (block 808). For example, supervisory communications support server 140 may receive notifications associated with a diversity of the tasks that the supervisors perform on a daily basis with respect to supervised agent WSs 122. Supervisory communications support server 140 may provide support for real time handling of the tasks/events including a notification and interaction mechanism that augments the skill set of the supervisor/coach as well as delivers information in a seamless fashion.

Supervisory communications support server 140 may provide alerts to supervisory interface device 150 based on a pub/sub system (block 810). For example, supervisory communications support server 140 may publish alerts based on particular events in network 100. Supervisory communications support server 140 may publish the alerts in response to instructions received from supervisory interface devices 150. Supervisory communications support server 140 may provide alerts when the subscribed events occur.

Supervisory communications support server 140 may receive and execute supervisory actions from supervisory interface device 150 (block 812). For example, supervisory communications support server 140 may allow the supervisory interface device 150 to bookmark, listen in, record, mark as read, transcribe via voice recognition in real time, etc.

Systems and/or methods described herein may provide a unified view interface including supervisory communications via diverse applications for supervising agent workstations. The systems and methods may gather management information for multiple systems into one single user interface that allows thresholds, alert types and notification mechanisms. The supervising user may perform actions based on the total context (as shown in diverse applications) of the supervisory communication. Although described with respect to agent work stations, systems and methods may be extended to any supervisor to supervised personnel environment. For example, the systems and methods may be applied to a production line environment.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer implemented method, comprising:
   identifying a supervisory workload associated with diverse applications that interface with at least one agent work station, wherein the diverse applications include a plurality of applications that are different from each other;
   generating a unified view interface that includes supervisory communications for the supervisory workload from the diverse applications in a single window based on common graphical elements and display rules associated with display and access of the diverse applications within the unified view interface;
   receiving a request for the unified view interface from a supervisory interface device;
   exporting the unified view interface to the supervisory interface device, wherein the diverse applications are provided in a unified display with the common graphical elements on the supervisory interface device within the unified view interface;
   receiving notifications associated with at least one of the diverse applications; and
   sending the notifications associated with the at least one of the diverse applications to be displayed on the unified view interface of the supervisory interface device within a context and a priority of the supervisory workload based on the common graphical elements and the display rules associated with the diverse application.

2. The computer implemented method of claim 1, further comprising:
   publishing, via a publication/subscription system, an available subscription for an alert associated with the supervisory workload based on detection of instances of a predetermined condition;
   receiving a subscription from the supervisory interface device to the available subscription for the alert;
   detecting at least one instance of the predetermined condition; and
   sending the alert to the unified view interface based on detection of the predetermined condition.

3. The computer implemented method of claim 2, wherein publishing the alert further comprises:
   receiving instructions that define the alert from the supervisory interface device.

4. The computer implemented method of claim 2, wherein publishing the alert further comprises:
   receiving instructions that define the alert based on a particular agent work station.

5. The computer implemented method of claim 1, wherein the diverse applications include a trending application and receiving notifications associated with the trending application further comprises:
   receiving trending information that identifies trends with regard to predefined performance parameters associated with the supervisory workload.

6. The computer implemented method of claim 1, wherein the diverse applications include a trending application and receiving notifications associated with the trending application further comprises:
   receiving trending information that identifies trends associated with the agent work stations for predefined parameters.

7. The computer implemented method of claim 1, wherein sending the notifications associated with the at least one of the diverse applications to be displayed on the unified view interface of the supervisory interface device further comprises sending the notifications based on a uniform format.

8. The computer implemented method of claim 1, further comprising:
   receiving supervisory action from the supervisory interface device based on the notifications; and
   executing the supervisory action.

9. The computer implemented method of claim 1, wherein sending the notifications to the supervisory interface device further comprises:
   sending the notifications based on at least one of particular types of calls, stages of a transaction or event, a call campaign, or categories of callers.

10. The computer implemented method of claim 1, wherein sending the notifications to the supervisory interface device further comprises:
    sending the notifications based on monitoring communications for the agent work stations.

11. A client device, comprising:
    a memory to store a plurality of instructions; and
    a processor to execute instructions in the memory to:
        identify a supervisory workload associated with diverse applications that interface with at least one agent work station, wherein the diverse applications include a plurality of applications that are different from each other;
        generate a unified view interface that includes supervisory communications for the supervisory workload from the diverse applications in a single window based on common graphical elements and display rules associated with display and access of the diverse applications within the unified view interface;
        receive notifications associated with the at least one of the diverse applications to be displayed on the unified view interface within a context and a priority of the supervisory workload based on the common graphical elements and the display rules associated with the diverse application;
        identify a relative position of each of the notifications within supervisory communications with respect to each other based on predetermined rules for displaying the supervisory communications; and
        display the notifications associated with the at least one of the diverse applications on the unified view interface of the supervisory interface device within a context and a priority of the supervisory workload based on the common graphical elements and the display rules associated with the diverse application.

12. The client device of claim 11, wherein the processor is further to:
    subscribe, via a publication/subscription system, to an available subscription for an alert associated with the supervisory workload based on detection of instances of a predetermined condition;
    receive alerts based on the subscription from a supervisory communications support device;
    detect at least one instance of the predetermined condition; and
    send the alert to the unified view interface based on detection of the predetermined condition.

13. The client device of claim 12, wherein the processor is further to:
    send instructions that define the alert based on a particular agent work station.

14. The client device of claim 12, wherein the processor is further to:
send instructions that define the alert based on a particular type of event.

15. The client device of claim 11, wherein the diverse applications include a trending application and wherein, when sending the notifications, the processor is further to:
send trending information that identifies trends with regard to predefined parameters.

16. The client device of claim 11, wherein sending the notifications to the supervisory interface device further comprises sending the notifications based on a uniform format.

17. The client device of claim 11, wherein the processor is further to:
send supervisory action commands based on the notifications.

18. The client device of claim 11, wherein the processor is further to execute instructions in the memory to:
receive and display the notifications based on at least one of particular types of calls, stages of a transaction or event, a call campaign, or categories of callers.

19. A non-transitory computer-readable medium including instructions to be executed by a processor, the instructions including one or more instructions, when executed by the processor, for causing the processor to:
identify a supervisory workload associated with diverse applications that interface with at least one agent work station; wherein the diverse applications include a plurality of applications that are different from each other;
generate a unified view interface that includes supervisory communications for the supervisory workload from the diverse applications in a single window based on common graphical elements and display rules associated with display and access of the diverse applications within the unified view interface;
receive a request for the unified view interface from the supervisory interface device;
export the unified view interface to the supervisory interface device, wherein the diverse applications are provided in the unified display with the common graphical elements on the supervisory interface device within the unified view interface;
receive notifications associated with at least one of the diverse applications; and
send the notifications associated with the at least one of the diverse applications to be displayed on the unified view interface of the supervisory interface device within a context and a priority of the supervisory workload based on the common graphical elements and the display rules associated with the diverse application.

20. The non-transitory computer-readable medium of claim 19, wherein the processor is configured to:
publish, via a publication/subscription system, an available subscription for an alert associated with the supervisory workload based on detection of instances of a predetermined condition;
receive a subscription from the supervisory interface device to the available subscription for the alert;
detect at least one instance of the predetermined condition; and
sending the alert to the unified view interface based on detection of the predetermined condition.

* * * * *